United States Patent [19]

Wiesböck

[11] 3,961,761
[45] June 8, 1976

[54] STORAGE DEVICE FOR A SAFETY BELT

[75] Inventor: Josef Wiesböck, Dachau, Germany

[73] Assignee: Hans Kolb KG, Munich, Germany

[22] Filed: Jan. 20, 1975

[21] Appl. No.: 542,247

[30] Foreign Application Priority Data
Jan. 21, 1974 Germany............................ 2402650

[52] U.S. Cl......................................... 242/107.4 A
[51] Int. Cl.²........................................ B65H 75/48
[58] Field of Search.................... 242/107.4, 107 R;
297/385, 386, 388; 280/150 SB

[56] References Cited
UNITED STATES PATENTS

| | | | |
|---|---|---|---|
| 3,430,891 | 3/1969 | Burleigh............................ | 242/107.4 |
| 3,442,466 | 5/1969 | Fritsche............................ | 242/107.4 |
| 3,666,198 | 5/1972 | Neumann.......................... | 242/107.4 |
| 3,722,824 | 3/1973 | Hayashi............................ | 242/107.4 |
| 3,741,494 | 6/1973 | Fiala................................. | 242/107.4 |
| 3,790,099 | 2/1974 | Beller................................ | 242/107.4 |

*Primary Examiner*—Edward J. McCarthy
*Attorney, Agent, or Firm*—Baldwin, Wight & Brown

[57] ABSTRACT

A storage device for a safety belt, including a rotably mounted coiling shaft to which one end of the belt is secured, inertia actuated means to lock the shaft against rotation in a direction of belt withdrawal and energy absorber means coupled between the shaft and the locking means.

5 Claims, 5 Drawing Figures

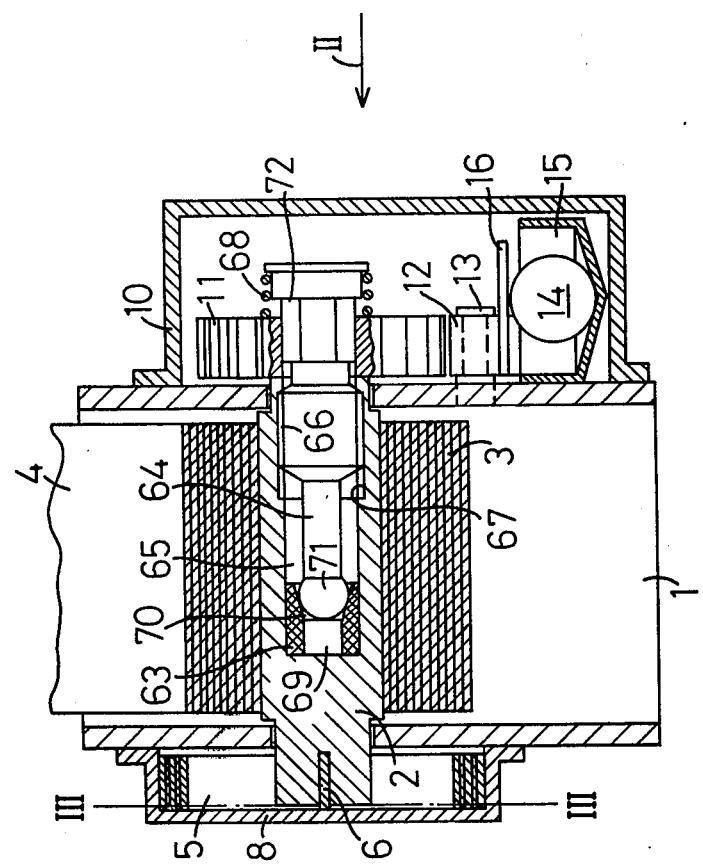
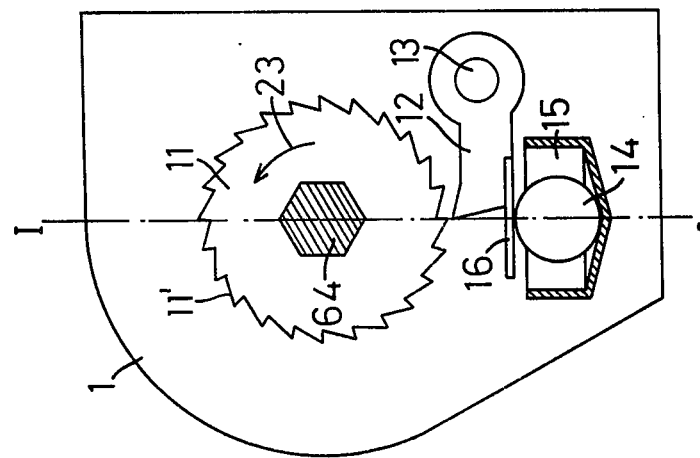
Fig. 1
Fig. 2

STORAGE DEVICE FOR A SAFETY BELT

Storage devices for safety-belts, in which the belt is wound up on a reel, are finding more and more acceptance in motor vehicles. They serve for protecting the belt when not being worn and for so holding it, in readiness, that the safety belt can at any time, immediately be put on. The belt is pulled out, i.e. unwound from the reel, against the action of a spring force which, when the safety belt is taken off, causes the belt to reel up again.

In such devices, the belt must be locked in the pull-out direction, when the vehicle concerned is decelerated in order that the safety belt fulfils its proper function, that is to say holds the seat occupant, in the vehicle, in his seat. If it were not for this locking of the belt, the occupant would be hurled forwards out of his seat.

Belt-sensitive and/or vehicle-sensitive, inertia locking mechanism are known which lock the belt against pull-out or withdrawal from the storage device or reel, at a specific belt pull-out acceleration of, for example, 1g, or at a specific vehicle deceleration of, for example, 0.4g, that is to say, at about half of the vehicle decelaration which takes place in an emergency braking.

The storage devices, for rolling up the belt, have a winding or coiling shaft, rotatably mounted in a housing, to which shaft the belt is secured at one end and which shaft is at one end connected to a spiral tension spring. The spiral spring loads the winding or coiling shaft in such a direction of rotation that the belt is reeled up on to the shaft. As a rule, at the other end of the winding or coiling shaft there is provided the belt-sensitive and/or vehicle-sensitive device for locking the belt against pull-out or withdrawal from the storage device.

For vehicle-sensitive locking of the belt, in the direction of pull-out, it is known to mount a ratchet wheel fast on the rotatable winding or coiling shaft with which ratchet wheel a detent or pawl is capable of being made to engage, under the influence of a movable inertia member. The inertia member may comprise a ball resting in a support. When the ball moves out of the resting position, the detent or pawl is caused to move into engagement with the ratchet wheel, thereby locking it and the shaft against rotation in a belt pull-out direction. Instead of a ball, the inertia member may comprise an inverted frustro-conical member standing on its smaller diameter end and capable of tilting at a specific deceleration of the vehicle to actuate locking of the belt.

It is also ratchet wheel to mount the ratchet wheel on the winding or coiling shaft so that, within limits, it can turn and move axially relative to the winding or coiling shaft. Thus the ratchet wheel may have an internal screw thread and the winding or coiling shaft may have a corresponding external screw thread. The ratchet-wheel may have peripheral teeth and an annular set of teeth on an end face, the latter being adapted to engage, upon axial displacement of the ratchet wheel, with teeth fixed with or part of a main housing of the storage device. When the detent or pawl is brought into engagement with the peripheral teeth, of the ratchet wheel, upon displacement of the inertia member, the ratchet wheel is held against further rotation and with a slight turning of the winding or coiling shaft, through pull on the safety belt, the ratchet wheel moves axially against the action of a restoring spring, so that the teeth on the face end come into engagement with the teeth fixed with or part of the main housing. Thus the ratchet wheel and the winding or coiling shaft are locked against rotation and further pull-out or withdrawal of the belt is prevented.

This latter construction is, moreover, belt-sensitive in that the ratchet wheel itself is an inertia member; that is to say when the belt is pulled out with sudden acceleration of for example, 1g, the ratchet wheel, in angular movement lags behind the winding or coiling shaft so that the shaft rotates relative to the ratchet wheel, whereby the ratchet wheel is displaced axially into locking engagement with the fixed teeth on the main housing. A further turning of the winding or coiling shaft is therefore arrested and belt pull-out is blocked.

It is desirable that safety belts, of motor vehicles, should be capable, directly or indirectly, of absorbing energy.

Since, however, with a rapid increase of the tensile force acting on a safety belt when loaded with mass of the seat occupant, the hysteresis of the belt is comparatively low, in other words the belt itself cannot absorb energy, various measures for energy absorption have already been proposed. For example, the belt may be pleated and sewn such that the seams tear at a specific load increase. Also, the lock of safety belts has been provided on plastically deformable stems, or the belt of safety belt has, at the end turned away from the lock, been secured to the vehicle via a deformable element in order to attain the desired energy absorption.

Also for purposes of energy absorption it has been proposed to construct the winding or coiling shaft in two parts; namely a bolt, to one end of which the ratchet wheel is keyed and a sleeve surrounding the bolt and joined to its other end, the belt being wound on the sleeve. With this arrangement the bolt experiences a lasting twist at a specific torsional stress.

The present invention seeks to provide a safety belt storage device and inertia locking mechanism which overcomes the disadvantages and difficulties set out above.

The present invention provides a storage device for a safety belt, including a rotatably mounted coiling shaft to which one end of the belt is secured insertia actuated means to lock the shaft against rotation in a direction of belt withdrawal and energy absorber means coupled between the shaft and the locking means.

Embodiments of the present invention are now described, by way of example, with reference to the accompanying drawings, in which FIG. 1 is a longitudinal sectional view taken along the line I — I in FIG. 2 through a first embodiment of the invention;

FIG. 2 is a side view of the invention taken in the direction of an arrow II in FIG. 1; the front housing cover being removed;

In the following description, like reference numerals are used to identify like parts.

Figure 4:
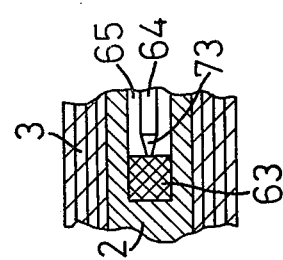
FIGS. 4 and 5 are fragmentary sectional views of two further embodiments of the invention.

Referring to the drawings, the mechanism includes a housing 1 in which is rotatably mounted a winding or coiling shaft 2 on which is a coil 3 of webbing comprising a safety belt 4. The belt 4, at one end, is secured to the shaft 2 and its other, free, end extends from the housing 1.

On one side of the housing there is provided a spiral, tension spring 5 with as flat a characteristic line as possible, which spring is secured at its inner end 6, to the shaft 2 and at its outer end 7 to a cover 8 which is screwed to the housing 1. When the belt 4 is pulled out of the housing 1, when the safety belt is put on, the shaft 2 rotates in the direction of the arrow 9 (see FIG. 3) and the spiral spring 5 is tensioned. When the safety belt is taken off, the belt 4 is automatically pulled into the housing 1 and wound or rolled on to the shaft 2, under the action of the spring loading of the tension spring 5.

Inside a cover 10, screwed to the housing 1, there is provided at the other end of the winding or coiling shaft 2, a ratchet wheel 11 with peripheral teeth 11' of sawtooth profile. Adjacent the ratchet wheel 11 there is pivotally mounted about a pin 13 fixed to the housing, a detent or pawl 12 which can be actuated by an inertia member in the form of ball 14. The ball 14 rests in a cage 15 fast with the housing 1.

The ratchet wheel 11 is secured to the winding or coiling shaft 2 and the detent or pawl 12 is arranged below the ratchet wheel 11 with a lateral tongue 16 of the pawl resting on the ball 14. Displacement of the ball 14 from its position of rest, shown in FIGS. 1 and 2, will lift the pawl 12 into engagement with the ratchet wheel to lock it against rotation in a belt withdrawal direction, indicated by the arrow 23.

In accordance with the invention, special measures are taken to ensure a reliable energy absorption in the case of rapidly increasing loading, on the belt 4 when the safety belt concerned is being worn and after the inertia locking mechanism has been actuated. Practically any desired degree of energy absorption may be attained.

As shown in the drawings there is provided a bolt 64 which is coupled to the coiling shaft 2 and is axially movable, through turning of the shaft 2 in the direction of unwinding of the belt, against an energy-absorbing cushion 63. The bolt 64 is arranged in a bore 65 of the shaft 2 and is formed with an external screw thread 66 which engages with an internal screw thread 67 of the shaft 2. The bolt 64 is, furthermore, slidably keyed to the ratchet wheel 11 as to rotate with the ratchet wheel 11. The bolt 64 is normally biassed against axial displacement relative to the ratchet wheel 11 by a pressure spring 68.

The energy absorption cushion 63 consists a plastically deformable material, for example metal or plastics material, which is arranged in and is held fast in the bore 65 of the shaft 2. The cushion 63 has a bore 69 with conical mouth 70 into which a ball end 71 of the bolt 64 can be pressed. Movement of the bolt 64 against the energy absorbing cushion 63 is limited by a stop 72, on the bolt 64, abutting against the ratchet wheel 11.

Figure 3:
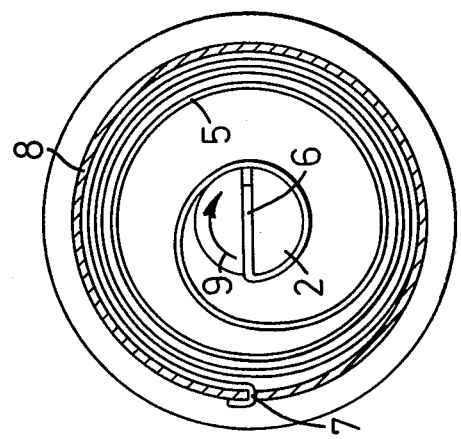
FIG. 3 is a sectional view taken along the line III — III in FIG. 1.

When the safety belt is being worn, the state of the device is as shown in FIGS. 1 to 3. When the vehicle concerned is decelerated to a specific extent, the ball 14 moves in the cage 15 and pivots the pawl 12 into engagement with the peripheral teeth 11' of the ratchet wheel 11, so that the belt 4 is blocked in the direction of pull-out and the vehicle occupant who has put the safety belt on, is restrained in his seat. If after blocking of the belt 4, it is subjected to a certain tensile stress, as is to be expected in an accident, the shaft 2 turns with respect to the bolt 64 which is held against rotation by the ratchet wheel 11. By the turning of the shaft 2 the bolt 64 is screwed into the shaft 2, i.e. axially displaced and the ball 71 forced into the energy absorbing cushion 63. Thus, after intial locking of the mechanism a certain further length of belt 4 may be pulled out of the housing 1 but work has to be preformed and energy is absorbed by the cushion 63.

The embodiment according to FIG. 4 differs from that according to FIGS. 1 to 3 merely in that the energy absorbing cushion 63 is massive, i.e. unperforated, and in that the bolt 64 has a tip 73 instead of a ball end 71 which tip can be pressed into the cushion 63.

Figure 5:
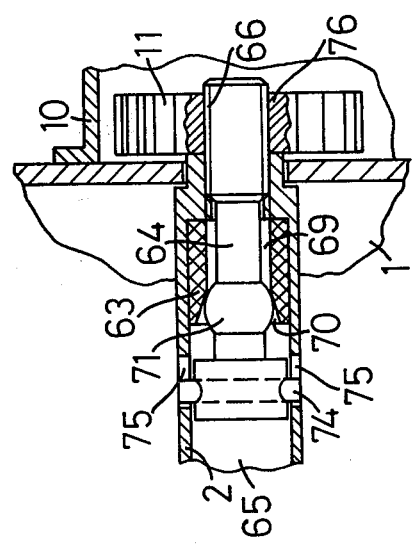

In the embodiment according to FIG. 5, the direction of axial displacement of the bolt 64, in the hollow shaft 2 against the energy-absorbing cushion 63, is reversed. Further, the bolt 64 is joined to the shaft in such a manner as to rotate with it but is axially slidable with respect to it and is capable of being screwed into the ratchet wheel 11. The bolt 64 is provided with a transverse pin 74 on that side of the ball end 71 remote from the ratchet wheel 11. The transverse pin 74 engages in two elongated slots 75 in the shaft 2. External screw thread 66 of the bolt 64 engages with an internal screw thread 76 in the ratchet wheel 11. When the shaft 2 is turned while the ratchet wheel 11 is locked against rotation, the bolt 64 rotates with the shaft 2 and, with plastic deformation of the energy absorbing cushion 63 by the ball end 71, screws into the toothed wheel 11.

The safety belt, of a storage device and inertia locking mechanism is, when it is not being worn, kept in state of readiness for use at any time and is protected from damage and dirt. The belt 4 is wound up on the shaft 2 in the housing 1. To put on the safety belt it is merely necessary to pull the belt out of the housing 1 and entrain it, in known manner, across the body of the seat occupant.

What claimed is:

1. A storage device for a safety belt, said storage belt including a rotatably mounted coiling shaft, said safety belt being secured at one end to said coiling shaft, inertia actuated locking means for locking said coiling shaft against rotation in a direction of belt withdrawal, a bolt member coupled between said coiling shaft and said locking means, and an energy absorbing cushion, said bolt member being axially movable against said energy absorbing cushion through turning of said coiling shaft due to belt withdrawal following actuation of said inertia means.

2. A storage device according to or claim 1, wherein said bolt member is keyed to said coiling shaft to rotate therewith and is in screw threaded engagement with a component fixed upon actuation of said locking means, whereby rotation of said coiling shaft and said bolt member will cause axial displacement of said bolt member against said energy absorbing cushion.

3. A storage device according to claim 1, wherein said bolt member is in screw threaded engagement with said coiling shaft and keyed to a component fixed upon actuation of said locking means, whereby rotation of said coiling shaft will cause axial displacement of said bolt member against said energy absorbing cushion.

4. A storage device according to claim 1 including a ratchet wheel coupled to said coiling shaft and being locked against rotation by said inertia actuated means.

5. A storage device according to claim 1 wherein said bolt member is arranged in a bore of said coiling shaft.

* * * * *